United States Patent [19]

Olsson

[11] Patent Number: 6,112,105
[45] Date of Patent: Aug. 29, 2000

[54] IDENTIFICATION ARRANGEMENT AND METHOD

[75] Inventor: Jan Evert Torbjörn Olsson, Södra Sandby, Sweden

[73] Assignee: Telefonaktiebolaget LM Ericsson, Stockholm, Sweden

[21] Appl. No.: 09/179,269

[22] Filed: Oct. 27, 1998

[30] Foreign Application Priority Data

Oct. 28, 1997 [SE] Sweden ................................. 9703931

[51] Int. Cl.$^7$ ................................ H02P 9/04; H02J 1/04; H04B 1/40

[52] U.S. Cl. ........................... 455/572; 455/573; 455/127; 455/343; 455/181.1; 320/15; 320/43; 320/17; 320/2

[58] Field of Search ..................................... 455/572, 573, 455/38.3, 571, 127, 181.1, 574, 343, 76; 320/15, 43, 2, 17, 48

[56] References Cited

U.S. PATENT DOCUMENTS

| | | | |
|---|---|---|---|
| 5,109,544 | 4/1992 | Mittel et al. | 455/182.2 |
| 5,136,616 | 8/1992 | Dent | 375/94 |
| 5,150,382 | 9/1992 | Kume | 375/88 |
| 5,164,652 | 11/1992 | Johnson et al. | 320/2 |
| 5,200,686 | 4/1993 | Lee | 320/2 |
| 5,237,257 | 8/1993 | Johnson et al. | 320/2 |
| 5,455,499 | 10/1995 | Uskali et al. | 320/43 |
| 5,460,901 | 10/1995 | Syrjälä | 429/90 |
| 5,465,400 | 11/1995 | Norimatsu | 455/76 |

(List continued on next page.)

FOREIGN PATENT DOCUMENTS

| | | |
|---|---|---|
| 0 381 636 A1 | 8/1990 | European Pat. Off. . |
| 0 642 202 A2 | 3/1995 | European Pat. Off. . |
| 2 260 454 | 4/1993 | United Kingdom . |
| WO 95/25375 | 9/1995 | WIPO . |
| WO 96/04738 | 2/1996 | WIPO . |

OTHER PUBLICATIONS

Chuang, J. et al., "Burst Coherent Demodulation with Combined Symbol Timing, Frequency Offset Estimation, and Diversity Selection," *IEEE Transactions on Communications*, vol. 39, No. 7, pp. 1157–1164 (Jul. 1991).

LaRosa, C.P. et al., "A Fully Digital Hardware Detector for $\pi/4$ QPSK," presented at the Vehicular Technology Society 42nd VTS Conference Frontiers of Technology (May 1992) and published in *IEEE*, pp. 293–297 (May 1992).

Bottomley, G.E. et al., "Adaptive Arrays and MLSE Equalization," presented at the 1995 IEEE 45th Vehicular Technology Conference, pp. 1–5 (Jul. 1995).

Wong, P.B. et al., "Low–complexity Diversity Combining Algorithms and Circuit Architectures for Co–channel Interference Cancellation and Frequency–Selective Fading Mitigation," *IEEE*, pp. 879–885 (Jun. 1996).

Sandh, H.; International Type Search Report; Jul. 19, 1998; Search Request No. SE 97/01286; pp. 1–4.

*Primary Examiner*—Wellington Chin
*Assistant Examiner*—Simon Nguyen
*Attorney, Agent, or Firm*—Jenkens & Gilchrist, P.C.

[57] ABSTRACT

The invention provides a battery identification arrangement, a battery equipment (120) suitable for identification and a battery identification method for implementation in an electronic equipment (110) such as a mobile station or a charger with a battery (13). The present invention also relates to a method to measure the temperature of a battery (13) connected to an electronic equipment (110). The battery identification arrangement includes both a measurement circuit (1) of the electronic equipment (110) and a battery circuit (14) of a battery equipment (120). On identifying, means in the measurement circuit (1) measure at least one identification voltage (Vid) which is generated by dividing a battery voltage (Vbat) into a division ratio by means of in series connected resistors (R1, R2) connected to ground (12). The resistors (R1, R2) are connected to the battery (13) only during measurement of the identification voltage (Vid) and the battery voltage (Vbat).

27 Claims, 11 Drawing Sheets

U.S. PATENT DOCUMENTS

| | | | |
|---|---|---|---|
| 5,469,478 | 11/1995 | Lee | 375/376 |
| 5,485,090 | 1/1996 | Stephens | 324/433 |
| 5,489,834 | 2/1996 | Pitkanen | 320/15 |
| 5,608,545 | 3/1997 | Kagawa | 455/127 |
| 5,613,227 | 3/1997 | Maki et al. | 455/127 |
| 5,857,151 | 1/1999 | Heinonen et al. | 455/572 |
| 5,864,766 | 1/1999 | Chiang | 455/572 |
| 5,877,564 | 3/1999 | Kuiri | 455/572 |
| 5,898,930 | 4/1999 | Terashima et al. | 455/38.3 |

IDENTIFICATION ARRANGEMENT AND METHOD

TECHNICAL FIELD OF THE INVENTION

The present invention relates to a battery identification arrangement of an electronic equipment with a battery and a battery equipment suitable for identification. The present invention also relates to a battery identification method for implementation in an electronic equipment with a battery. The present invention also relates to a method to measure the temperature of a battery connected to an electronic equipment.

DESCRIPTION OF RELATED ART

Some portable radio communication equipments use a detachable rechargeable battery as a power supply.

A portable radio communication equipment, which herein after is referred to as a mobile station, includes all portable radio communication equipment such as mobile stations, pagers, communicators, so called electronic organizers, or the like.

Numerous different types of detachable battery types are available in view of the portability and power supply efficiency of the mobile station. A standard battery, i.e. a battery with a standard capacity, is used for standard use and a battery which has a large capacity is used for prolonged high power use. The batteries can be of different types such as nickel-cadmium batteries, nickel metal hydride batteries, alkaline batteries, manganese batteries or lithium-ion batteries. Each battery has different battery parameters such as voltage or current capacities, number of cells and temperature. It is necessary to know some of these parameters in order to verify that a battery which is attached to a mobile station is of the correct type. Otherwise the battery might for instance leak chemical substances or output the wrong voltage or be charged in a wrong way.

A mobile station which uses a battery may have a function of automatically discriminating the battery connected to the mobile station if the battery does not match the mobile station. Also chargers for rechargeable batteries may have this function.

Different types of battery keying methods used for determining which type of battery that is connected to the electronic equipment are known such as mechanical keying, magnetic keying, optical keying and electrical keying. Electrical keying can be realised by means of a key resistor in the battery. Other known methods for determining which type of battery that is connected to the electronic equipment are to include a memory or a number of diodes in the battery.

U.S. Pat. No. 5,200,686 describes a method and an apparatus for distinguishing between different types of batteries that are connected to a battery power equipment. In U.S. Pat. No. 5,200,686 determination of battery type is accomplished by measuring the value of a resistance of a resistor internal to the battery. According to an embodiment of U.S. Pat. No. 5,200,686 the resistor with the resistance that is to be measured is placed in a voltage divider network to which a known voltage is applied. The voltage divider network is placed internal to the battery and comprises one or more known resistances besides the resistor with the resistance that is to be measured. One disadvantage with the method and apparatus described in U.S. Pat. No. 5,200,686 is that the absolute tolerance of the resistor with the resistance that is to be measured is limiting the number of different types of batteries which it is possible to distinguish.

U.S. Pat. No. 5,489,834 describes a circuit for determining the temperature and type of battery selected from a plurality of battery types. The temperature is detected by measuring the voltage drop across a temperature dependant first resistor in the battery. The measured voltage is scaled to different levels by a second resistor in order to determine the type of battery. One disadvantage with the circuit described in U.S. Pat. No. 5,489,834 is that the absolute tolerance of the first and second resistor is limiting the number of different types of batteries which it is possible to distinguish.

EP 642,202 describes an electronic device and a battery. The electronic device switches its operation mode in accordance with the type of installed battery. The battery has a regulator, a specification-discriminating terminal, and a resistor, connected between the regulator and the specification-discriminating terminal. The resistor has a resistance corresponding to the specification of the incorporated battery. The electronic device has a monitor resistor connected between a terminal connected to the specification-discriminating terminal of the battery and ground, a discriminating circuit for detecting a monitor voltage generated across this monitor resistor to discriminate the specification of the battery, and a switch controller for switching the operation mode in accordance with the specification discriminated by the discriminating circuit.

One disadvantage with the technique described in EP 642,202 is that both the resistor connected between the regulator and the specification-discriminating terminal and the monitor resistor connected between the terminal connected to the specification-discriminating terminal of the battery and ground, consume power also when the determination of type of battery already has been made.

U.S. Pat. No. 5,237,257 and U.S. Pat. No. 5,164,652 describe a method and an apparatus to detect the type of battery connected to a circuit of a battery operated equipment. A first resistor is disposed within the battery operated equipment. A second resistor having a resistance selected in accordance with the particular battery is disposed within the battery. A battery type detector measures a sense input signal which is generated from a regulated voltage reduced in proportion to the ratio of the first resistor and the second resistor. One disadvantage with the method and apparatus described in U.S. Pat. No. 5,237,257 and U.S. Pat. No. 5,164,652 is that the resistors internal to the battery and the battery operated equipment that are used for determination of the battery type consume power also when the determination of battery type already has been made. Yet another disadvantage with the method and apparatus described in U.S. Pat. No. 5,237,257 and U.S. Pat. No. 5,164,652 is that the absolute tolerance of the first and second resistor is limiting the number of different types of batteries which it is possible to distinguish.

SUMMARY OF THE INVENTION

The general problem dealt with by the present invention is to provide a battery equipment suitable for identification and a battery identification arrangement. The problem also includes a method for implementation in an electronic equipment with a battery. The term battery herein after refers to the battery cells of a unit, and the unit comprising those battery cells herein after is referred to as a battery equipment. The electronic equipment can be a charger or any kind of portable radio communication equipment such as mobile stations, pagers, communicators, so called electronic organizers, or the like.

A more specific problem dealt with by the present invention is to provide a battery identification arrangement and a method for implementation in an electronic equipment with a battery which distinguishes many different types of batteries that are coupled to an electronic equipment from each other and which consumes no power in stand-by mode.

A further more specific problem dealt with by the present invention is to measure the temperature of a battery connected to an electronic equipment.

The problem is solved essentially by a battery equipment and also by a battery identification arrangement in which at least one identification voltage is generated by dividing a battery voltage into a division ratio by means of in series connected resistors connected to ground. The resistors are connected to the battery only during the measurement of the identification voltage and the battery voltage.

More specifically, the battery identification arrangement includes both a measurement circuit of the electronic equipment and a battery circuit of the battery equipment. Means in the measurement circuit measure the identification voltage and the battery voltage. The value of the identification voltage distinguishes different batteries from each other. A controller of the measurement circuit controls a control switch of the measurement circuit and a time delay switch of a time delay circuit of the battery circuit. During measurement, first both the control switch and the time delay switch are closed when the battery voltage is measured. Secondly, the control switch is opened and the time delay switch is closed when the identification voltage is measured. When the measurement has been made, both the control switch and the time delay switch are opened, which prevents that the battery identification arrangement consumes power when the determination of the type of battery has been made, i.e. in stand-by mode.

The invention makes it also possible to measure the temperature of the battery. The in series connected resistors can be selected to have well defined temperature coefficients and a current generator is generating a predetermined current through one of the in series connected resistors. The voltage over one of the in series connected resistors to ground is measured.

More precisely, the present invention also relates to a battery identification method for implementation in an electronic equipment with a battery. The battery identification method is used for determining which type of battery that is connected to the electronic equipment.

A general object of the present invention is to provide a battery equipment suitable for identification and a battery identification arrangement. The object is also to provide a method for implementation in an electronic equipment with a battery for determination of which type of battery that is connected to the electronic equipment.

It is another object of the present invention to select and modify parameters of the battery equipment and the battery identification arrangement according to the type of battery that is to be identified. These parameters are the values of the resistances of the in series connected resistors.

A further object of the present invention is to provide a battery identification arrangement and a method for implementation in an electronic equipment that consumes no power in stand-by mode.

A further object of the present invention is to distinguish many different types of batteries, that are coupled to an electronic equipment, from each other.

A further object of the present invention is to measure the temperature of a battery connected to an electronic equipment.

A further object of the present invention is to provide a battery identification arrangement and a method for implementation in an electronic equipment that is temperature stable.

A general advantage afforded by the present invention is that a safe battery identification arrangement and a method for implementation in an electronic equipment with a battery are provided.

A more specific advantage afforded by the present invention is that a method and an arrangement that consumes no power when the determination of the type of battery already has been made, i.e. in stand-by mode, are provided.

A more specific advantage afforded by the present invention is that a method and an arrangement which distinguishes many different types of batteries that are coupled to an electronic equipment form each other are provided. This is easily obtained by matching the in series connected resistors to each other.

Another more specific advantage afforded by the present invention is that many different types of batteries can be identified since parameters of the battery identification arrangement can be selected and modified according to the type of battery which is to be identified.

Another more specific advantage afforded by the present invention is that it is possible to measure the temperature of the battery.

Another more specific advantage afforded by the present invention is that the battery identification method is temperature stable. This is because the identification voltage which is generated by dividing the battery voltage into a division ratio does not change with temperature.

Yet another more specific advantage afforded by the present invention is that the implementation of the hardware of the controller is simple.

The invention will now be described more in detail below with reference to the appended drawings which illustrate various aspects of the invention by means of embodiments. The invention is not limited to these embodiments.

DETAILED DESCRIPTION OF EMBODIMENTS

Figure 1:
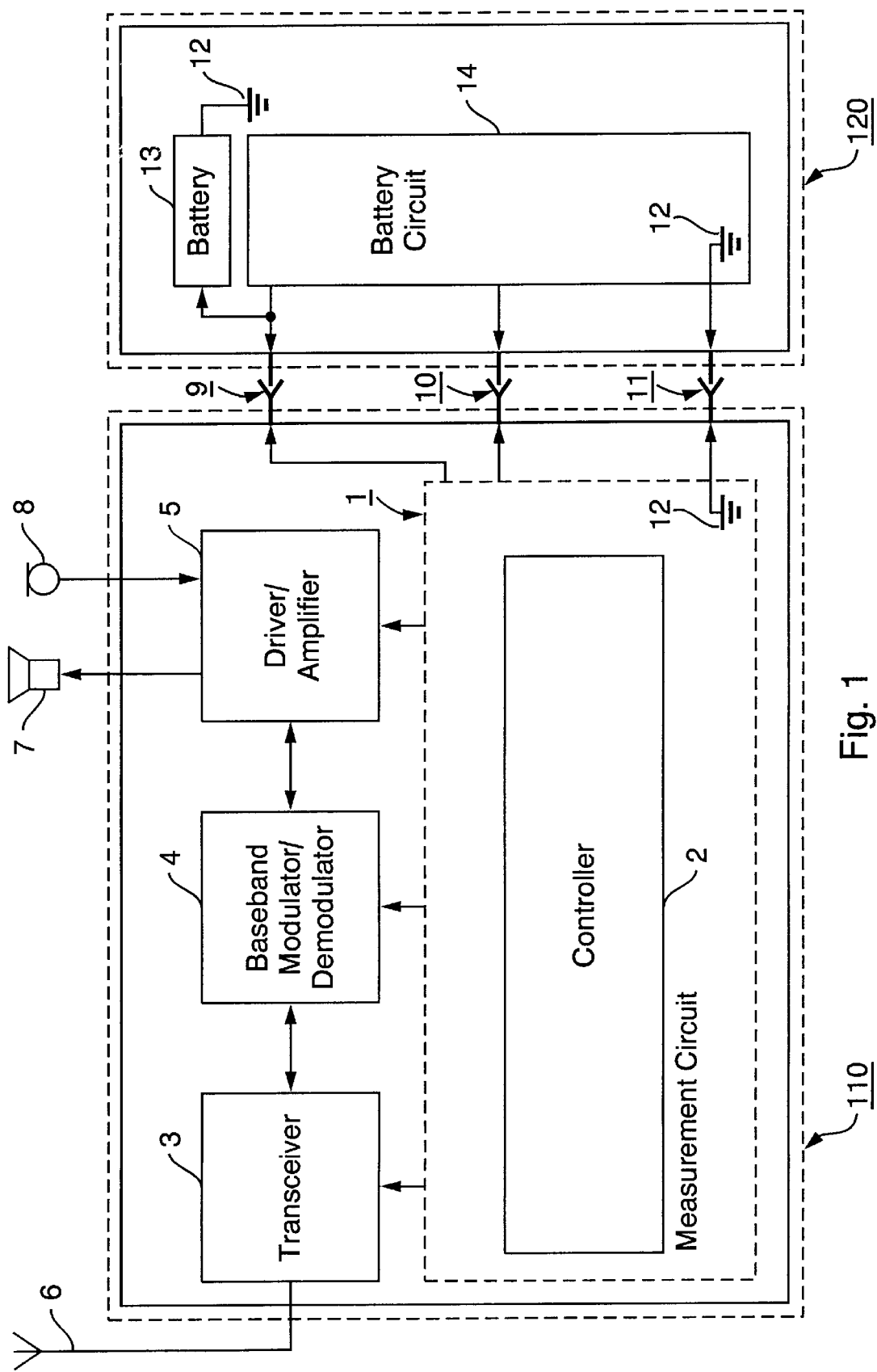
FIG. 1 is a schematic view of blocks in a mobile station and a battery equipment.

FIG. 1 illustrates a block view of an electronic equipment 110 and a battery equipment 120.

The electronic equipment 110 is a mobile station that comprises a measurement circuit 1 which comprises a controller 2. The controller 2 controls a transceiver 3, a baseband modulator/demodulator 4 and a driver/amplifier 5 of the mobile station 110. The transceiver 3 is coupled to an antenna 6 of the mobile station 110. The driver/amplifier 5 is coupled to a microphone 8 and a speaker 7 of the mobile station 110. The transceiver 3 and the baseband modulator/demodulator 4 are coupled to each other and also the baseband modulator/demodulator 4 and the driver/amplifier 5 are coupled to each other. The measurement circuit 1 is connected to a battery voltage connection 9, to a measurement and control connection 10 and to a ground connection 11 which is connected to ground 12. Hence, the measurement circuit 1 is connected to ground 12.

The battery equipment 120 comprises a battery 13 and a battery circuit 14. The battery 13 is connected to ground 12 and to the battery voltage connection 9. The battery circuit 14 is connected to the battery voltage connection 9, to the measurement and control connection 10 and to the ground connection 11. Hence, the battery circuit is connected to ground 12.

The mobile station 110 and the battery equipment 120 are connected to each other at the battery voltage connection 9, at the measurement and control connection 10 and at the ground connection 11 when connecting the mobile station to the battery equipment.

Figure 2:
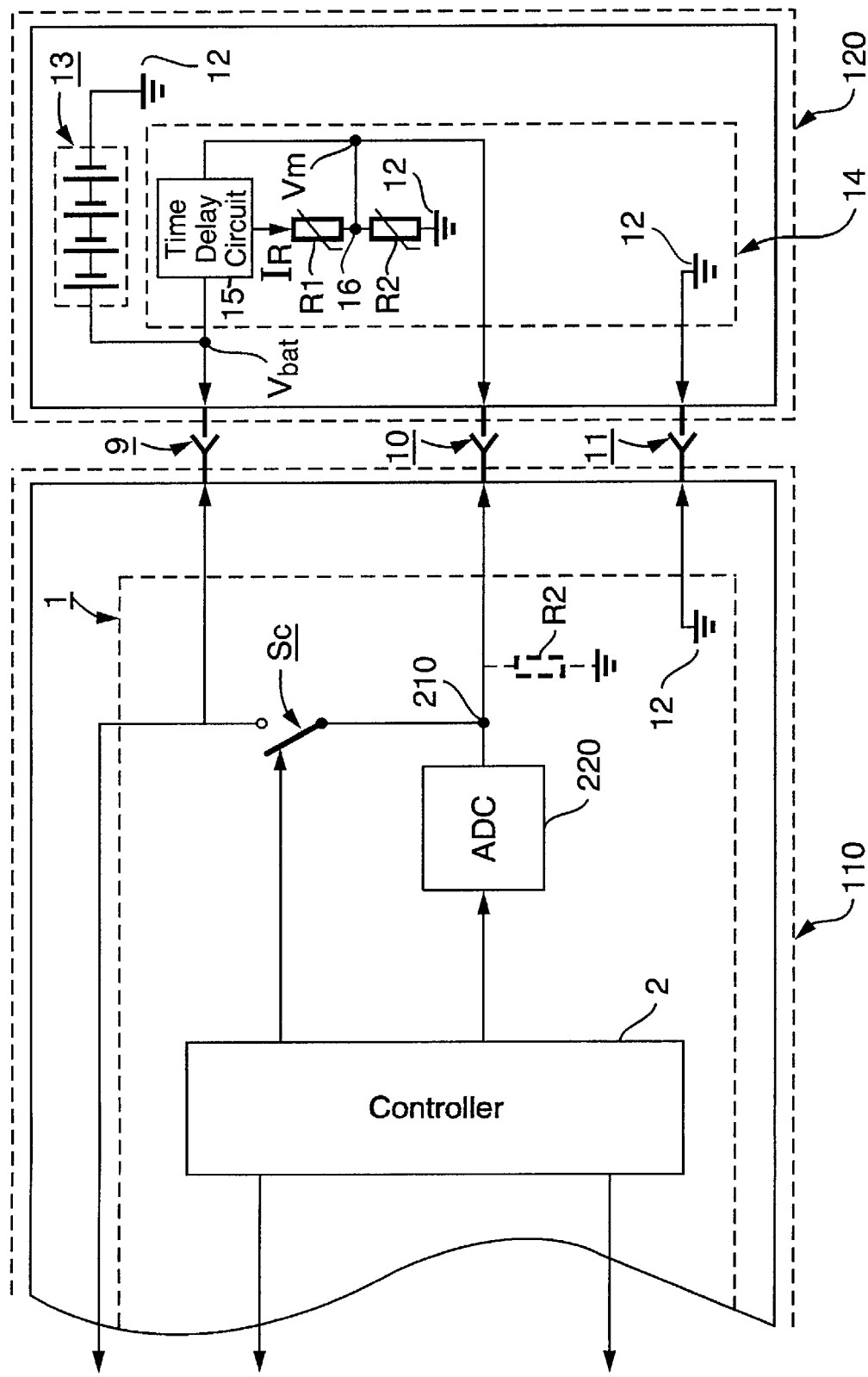
FIG. 2 illustrates a block scheme of an inventive arrangement with a battery circuit.

FIG. 2 illustrates a block view of a battery identification arrangement of the present invention illustrated in FIG. 1.

The battery identification arrangement comprises the measurement circuit 1, the battery circuit 14 and the battery 13 which all are connected to ground 12. The measurement circuit 1 is comprised in the electronic equipment which is the mobile station 110.

The measurement circuit 1 comprises a controller 2. The controller 2 controls those functions of the mobile station 110 which are not comprised in the measurement circuit 1 (see FIG. 1). The controller 2 also controls an analogue-to-digital converter 220 and a control switch Sc of the measurement circuit 1. The measurement circuit 1 is connected to the battery voltage connection 9, to the measurement and control connection 10 and to the ground connection 11 which is connected to ground 12. The measurement circuit 1 is also connected to functions of the mobile station 110 which are not comprised in the measurement circuit 1. The control switch Sc, which is controlled by the controller 2, is connected between the battery voltage connection 9 and the measurement and control connection 10.

There is a dividing connection 210 between the control switch Sc and the measurement and control connection 10. The analogue-to-digital converter 220, which also is controlled by the controller 2, is connected to the dividing connection 210 between the control switch Sc and the measurement and control connection 10.

The battery circuit 14 comprises a time delay circuit 15 and a first and a second in series connected resistors R1, R2. The first resistor R1 of the in series connected resistors is connected to the time delay circuit 15. The second resistor R2 is connected to ground 12. There is a dividing connection 16 between the in series connected resistors R1, R2 at which there is a potential which is a measurement voltage Vm. The time delay circuit 15 is connected to the battery voltage connection 9, to the measurement and control connection 10 and to the dividing connection 16 between the in series connected resistors R1, R2.

In a preferred embodiment of the present invention, the two in series connected resistors R1, R2 have common well defined temperature coefficients, i.e. the resistance of the resistors R1, R2 vary equally with the temperature. This embodiment of the present invention is further described in FIG. 6.

The battery 13 has poles which are connected between the battery voltage connection 9 and ground 12, respectively. There is a potential at the battery voltage connection 9 which is the battery voltage Vbat.

The mobile station 110 and the battery equipment 120, and hence the measurement circuit 1 and the battery circuit 14, are connected to each other at the battery voltage connection 9, at the measurement and control connection 10 and at the ground connection 11 when connecting the battery equipment to the mobile station.

The battery identification arrangement is used for determining which type of battery 13 that is connected to the mobile station 110. During measurement, the mobile station 110 and the battery equipment 120 are connected to each other wherein the controller 2 controls the control switch Sc, the time delay circuit 15 and the analogue-to-digital converter 220.

The analogue-to-digital converter 220 measure battery circuit characteristics which are the battery voltage Vbat and a battery identification voltage Vid (see FIGS. 7a–7d). Both the battery voltage Vbat and the battery identification voltage Vid are measured at the measurement and control connection 10. The value of the identification voltage Vid distinguishes different batteries from each other which is further described in FIG. 8.

It shall be noted that the inventive arrangement requires only the three connections 9, 10, 11 between the mobile station and the battery equipment. This is of importance since such connections are of high quality and rather expensive.

Figure 3:
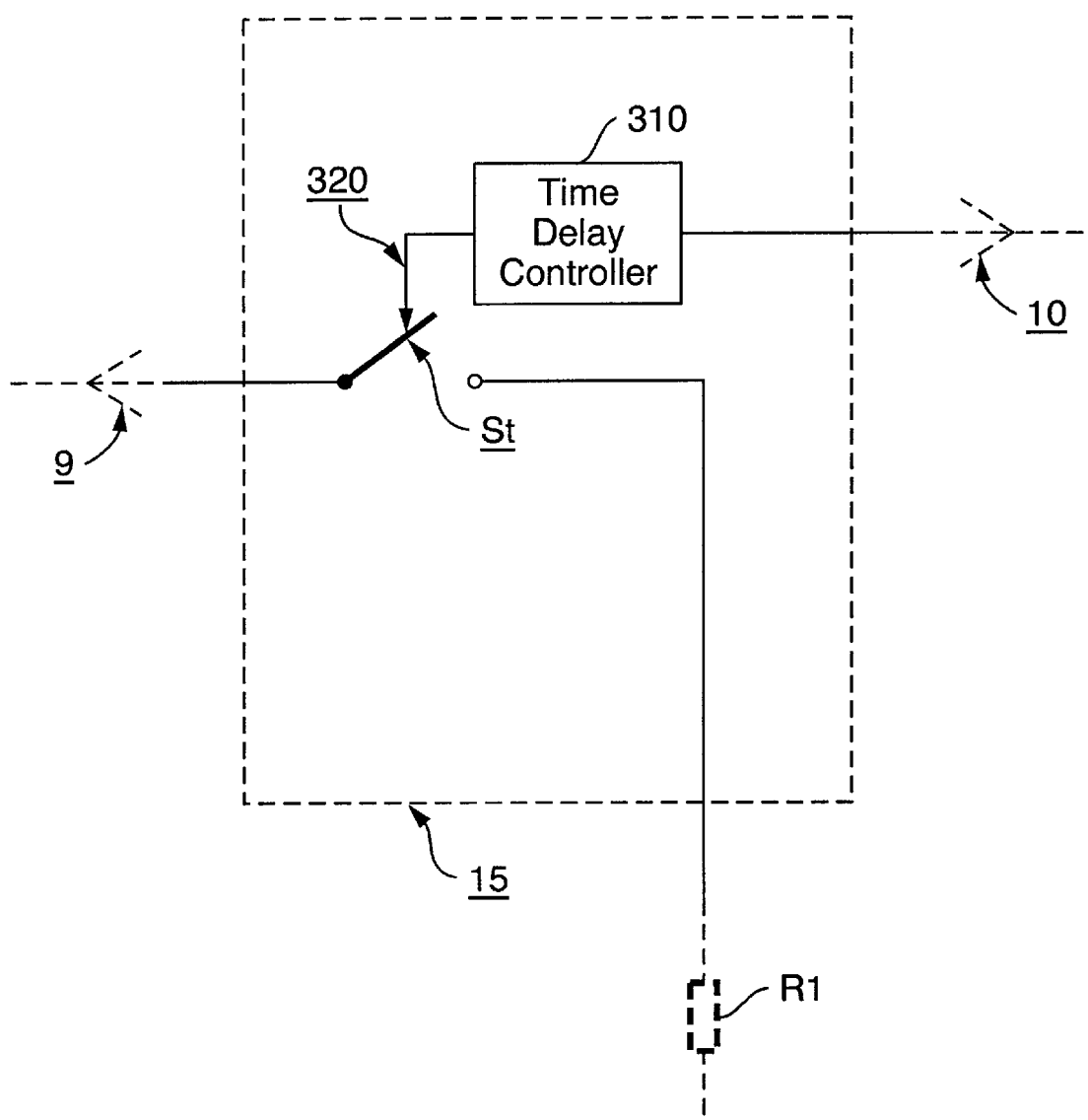
FIG. 3 is a schematic view of a time delay circuit of the battery circuit.

The operation of the battery identification arrangement will here be described in an embodiment as shown in FIG. 3. This Figure is a schematic view of a time delay circuit of the present invention illustrated in FIG. 2. The time delay circuit 15 comprises a time delay switch St and a time delay controller 310. The time delay switch St is connected between the battery voltage connection 9 shown in dashed lines (compare FIG. 2) and the resistor R1 shown in dashed lines (compare FIG. 2). The time delay controller 310 which controls the time delay switch St is connected to the measurement and control connection 10 shown in dashed lines (compare FIG. 2). There is a control input 320 of the time delay switch St. The control input 320 is connected to the time delay controller 310. The time delay controller 310 is controlled via a signal transmitted from the measurement and control connection 10 (see FIG. 2). The time delay switch St can be of different types of switches such as a mechanical switch or a transistor.

The controller 2 of the measurement circuit 1 initiates measurement of the identification voltage Vid and the battery voltage Vbat wherein the control switch Sc and the time delay switch St are closed when the battery voltage Vbat is measured by the analogue-to-digital converter ADC. Secondly, the control switch Sc is opened and the time delay switch St is closed when the identification voltage Vid is measured by the analogue-to-digital converter ADC. When the measurement has been made, both the control switch and the time delay switch are open, which prevents that the battery identification arrangement consumes power when the determination of the type of battery 13 has been made, .i.e. in stand-by mode.

Figure 8:
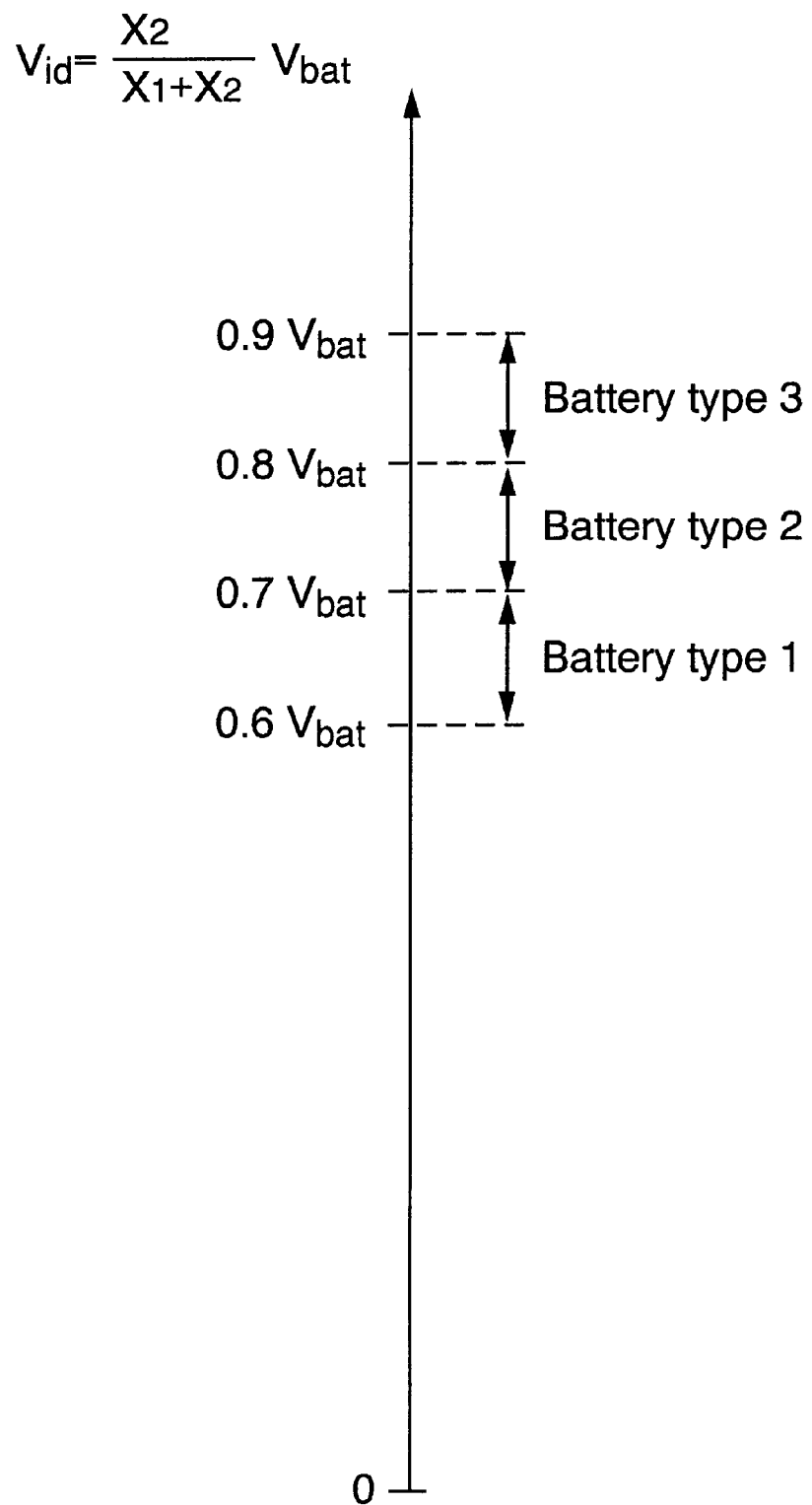
FIG. 8 illustrates examples of how the division ratio between the resistance of different in series connected resistors R1, R2 of the battery circuit can vary in different embodiments of the present invention.

The time delay switch St is closed when the identification voltage Vid, which can not be generated by the battery circuit 14, is above a certain level (see FIG. 8). The time delay controller 310 holds the voltage at the dividing connection 16 between the in series connected resistors R1, R2 at the level of the battery identification voltage Vid until the analogue-to-digital converter has finished the voltage detection. Hereby the time delay switch St prevents that the battery identification arrangement consumes power in stand-by-mode. The battery identification voltage Vid is generated by dividing the battery voltage Vid into a division ratio by means of the in series connected resistors R1, R2 connected to ground 12. The resistors R1, R2 are connected to the battery 13 only during the measurement of the identification voltage Vid and the battery voltage Vbat. A current $I_R$ passes the resistor R1 during the identification.

It shall be mentioned that in an alternative embodiment of the present invention the resistor R2 of the in series connected resistors R1, R2 that is connected to ground 12 is arranged in the measurement circuit 1 instead of in the battery circuit 14. This is shown in dashed lines in FIG. 2. In this embodiment, the resistors R1, R2 are connected in series when the mobile station 110 and the battery equipment 120 are connected to each other.

It shall also be mentioned that the present invention can be accomplished without any time delay circuit 15. In this embodiment the battery voltage Vbat and the identification voltage Vid are measured without switching on and off any time delay switch (see FIGS. 7a–7e). However, in this embodiment the total current consumption IC of the measurement circuit will not be zero after the time period TSt (see FIG. 7e).

Figure 4:
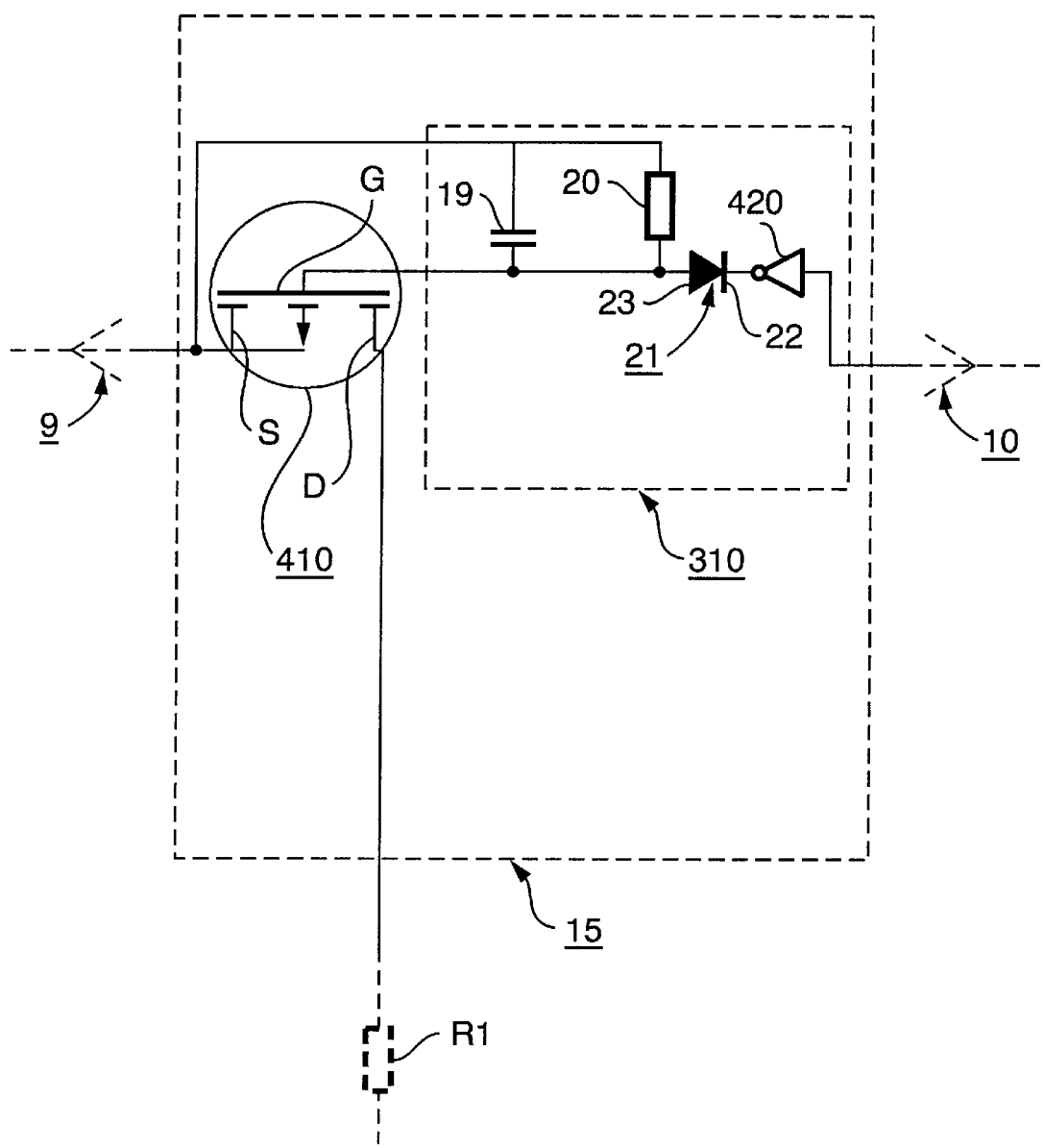
FIG. 4 illustrates in a scheme an embodiment of the time delay circuit of the battery circuit.

FIG. 4 illustrates in a scheme an embodiment of the time delay circuit of the present invention illustrated in FIG. 3. The time delay circuit comprises the time delay switch and the time delay controller.

The time delay switch St consists of a CMOS-transistor 410 having a gate G, a drain D and a source S. The gate G is connected to the time delay controller 310, the drain D is connected to the resistor R1 shown in dashed lines (compare FIG. 2) and the source S is connected to the battery voltage connection 9 shown in dashed lines (compare FIG. 2).

The time delay controller 310 consists of a capacitor 19, a resistor 20, an inverter 420 and a diode 21 having a cathode 22 and an anode 23. The inverter 420 is connected between the measurement and control connection 10 and the cathode 22. The anode 23 is connected to the gate G of the CMOS-transistor 410. The capacitor 19 and the resistor 20 are each connected between the anode 23 and the battery voltage connection 9. The time delay controller 310 is controlled via a signal transmitted from the measurement and control connection 10.

The operation of the battery identification arrangement in FIG. 4 is in accordance with the operation of the battery identification arrangement described in FIG. 3.

The time delay switch St can be of different types of switches such as a mechanical switch or a transistor. The time delay switch St is connected between the battery voltage connection 9 shown in dashed lines and the resistor R1 shown in dashed lines (compare FIG. 2). The time delay switch St is controlled via a signal transmitted from the measurement and control connection 10 (see FIG. 2), i.e. there is a control input which in FIG. 4 is the gate G of the time delay switch St. The control input is connected to the measurement and control connection 10 shown in dashed lines (compare FIG. 2).

Figure 5:
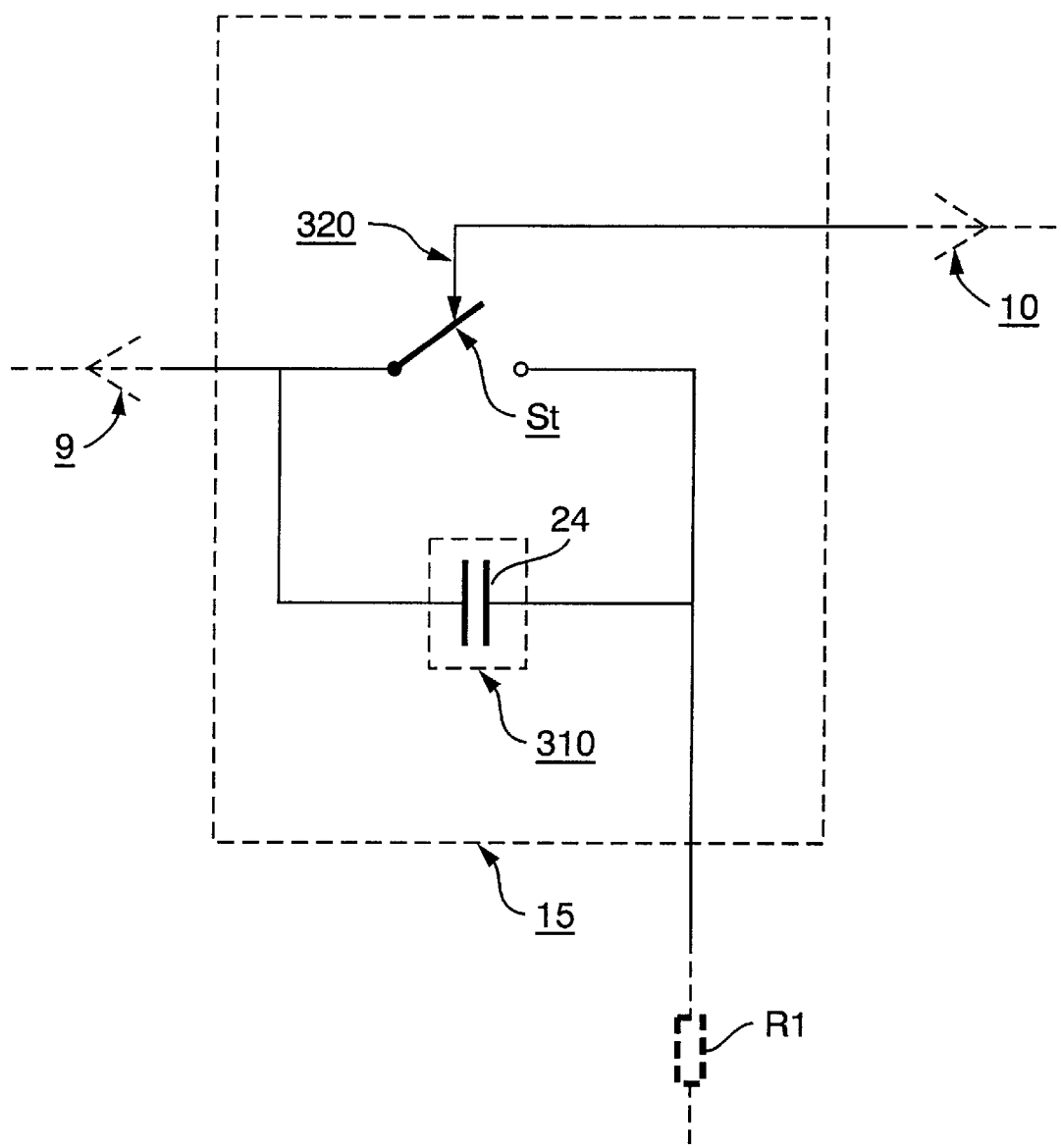
FIG. 5 illustrates in a scheme an embodiment of the time delay circuit of the battery circuit.

FIG. 5 illustrates in a scheme an embodiment of the time delay circuit 15 of the present invention illustrated in FIG. 3.

The time delay controller 310 consists of a capacitor 24 which is connected in parallel with the time delay switch St.

There is a control input 320 of the time delay switch St. The control input 320 is connected to the measurement and control connection 10 shown in dashed lines (compare FIG. 2).

The operation of the battery identification arrangement in FIG. 5 is in accordance with the operation of the battery identification arrangement described in FIG. 2.

Figure 6:
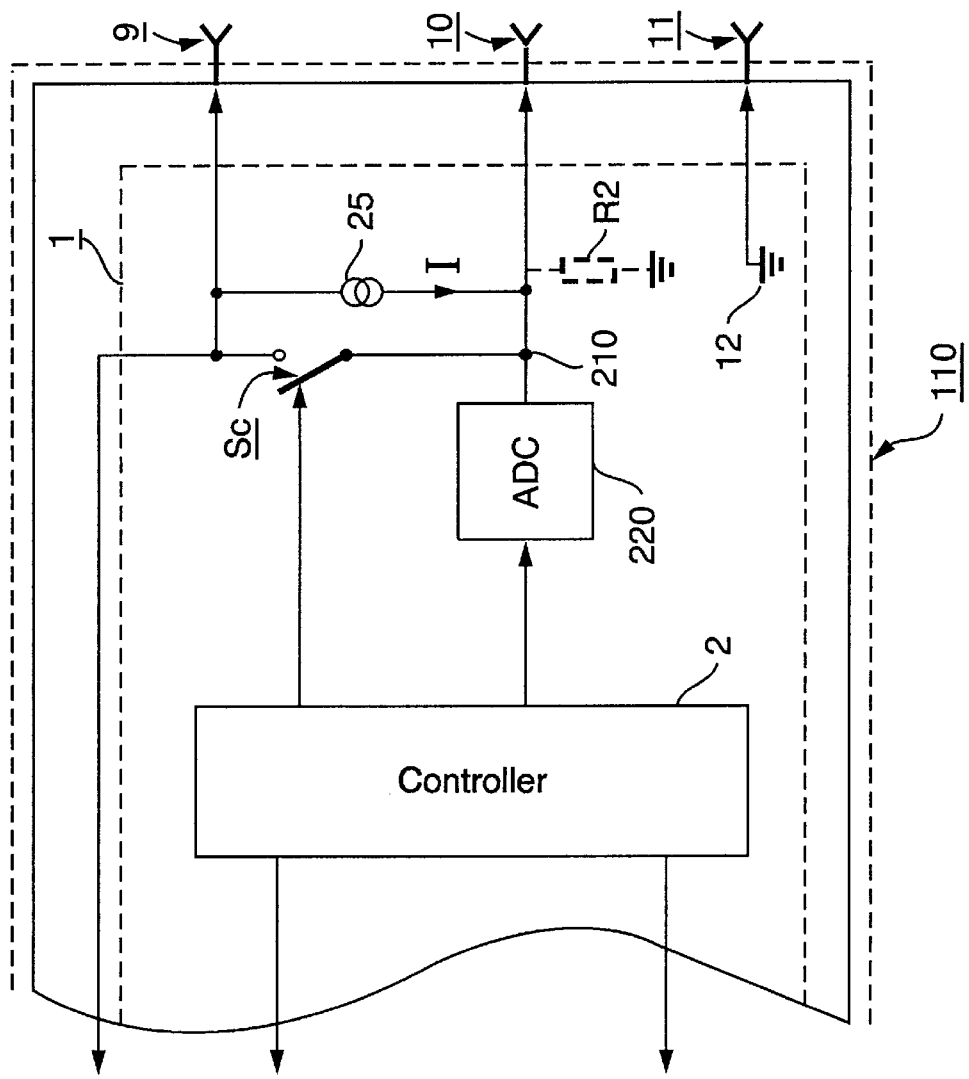
FIG. 6 illustrates in a scheme an embodiment of a measurement circuit of the mobile station.

FIG. 6 illustrates in a scheme an embodiment of the measurement circuit 1 of the present invention.

The embodiment is identical with the embodiment of the present invention illustrated in FIG. 2, except of that the measurement circuit 1 in FIG. 6 also comprises a current generator 25 and that the in series connected resistors R1, R2 shall have a common well defined temperature coefficients, i.e. the resistance of the resistors R1, R2 shall vary equally with the temperature.

The current generator 25, which is controlled via the controller 2, is connected between the battery voltage connection 9 and the measurement and control connection 10. The current generator 25 is arranged for delivering a predetermined current I through the in series connected resistor R2 (see FIG. 2) for measuring the temperature of the battery circuit 14. The temperature of the battery circuit 14 is measured by measuring the measurement voltage Vm without switching on any of the control switch Sc or time delay switch St. Consequently, since the measurement voltage Vm is measured, the current $I_R$=I (see FIG. 2) is known and the temperature coefficients of the in series connected resistors R1, R2 are known it is then possible to calculate the temperature of the battery circuit 14. The temperature of the battery circuit 14 is in practice the same as the temperature of the battery 13.

FIGS. 7a–7e show time diagrams of the function of the described battery identification arrangement. Time is denoted by t in the diagrams. In those Figures, the values of the identification voltage Vid and the battery voltage Vbat are the values of the measurement voltage Vm during a time period. TVid and a time period TSc, respectively.

Figure 7A:
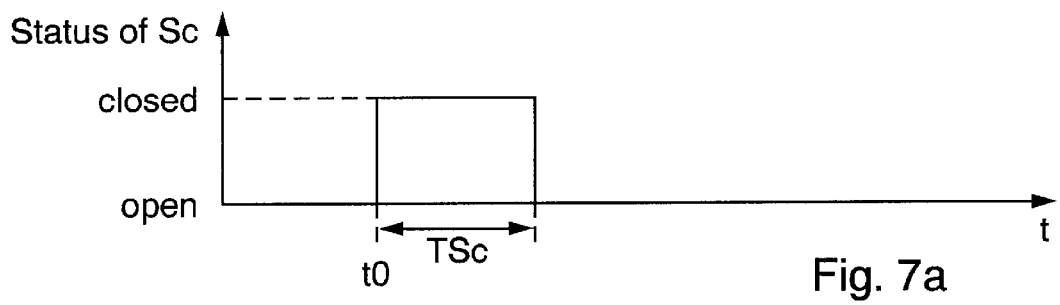
FIG. 7a illustrates in a time diagram the status open/closed of a switch in the measurement circuit.

FIG. 7a illustrates in a time diagram the status open/closed of the control switch Sc of the measurement circuit 1 described in FIG. 2.

During measurement of the battery voltage Vbat, which is initiated at a start time to, the control switch Sc is closed for the time delay period TSc beginning at the start time t0. The time delay period TSc which is a constant of the time delay circuit 15 (see FIG. 2) is defined by means of the time delay controller (see FIGS. 3–5).

Figure 7B:
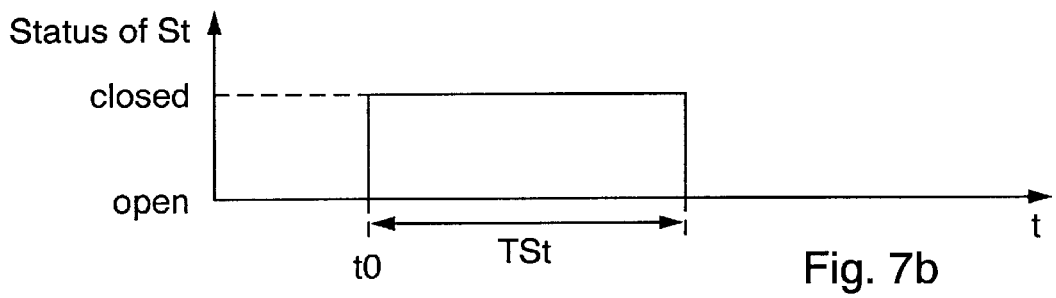
FIG. 7b illustrates in a time diagram the status open/closed of a switch in the time delay circuit.

FIG. 7b illustrates in a time diagram the status open/closed of the time delay switch St of the time delay circuit 15 described in FIG. 3.

During measurement of the battery voltage Vbat and the identification voltage Vid, which is initiated at the start time to, the time delay switch St is closed for a time period TSt beginning at the start time to.

Figure 7C:
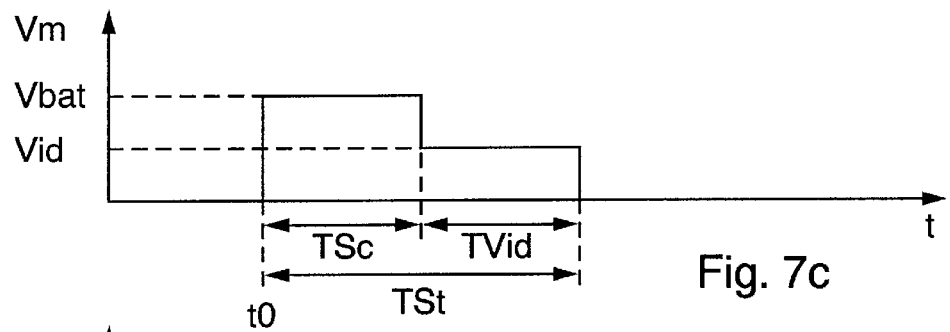
FIG. 7c illustrates in a time diagram the potential at a measurement and control connection between the measurement circuit and the battery circuit according to an embodiment of the present invention.

FIG. 7c illustrates in a time diagram the potential at the dividing connection 16 between the in series connected resistors R1, R2, i.e. the measurement voltage Vm, according to an embodiment of the present invention where the time delay switch St consists of a CMOS-transistor (see FIG. 4).

During measurement of the battery voltage Vbat, which is initiated at the start time to, the control switch Sc and the time delay switch St are closed for a time period TSc beginning at the start time to (see FIG. 7a and FIG. 7b). Likewise, the identification voltage Vid is measured during the time period TVid while the control switch Sc is open and the time delay switch St is closed (see FIGS. 7a and 7b).

Figure 7D:
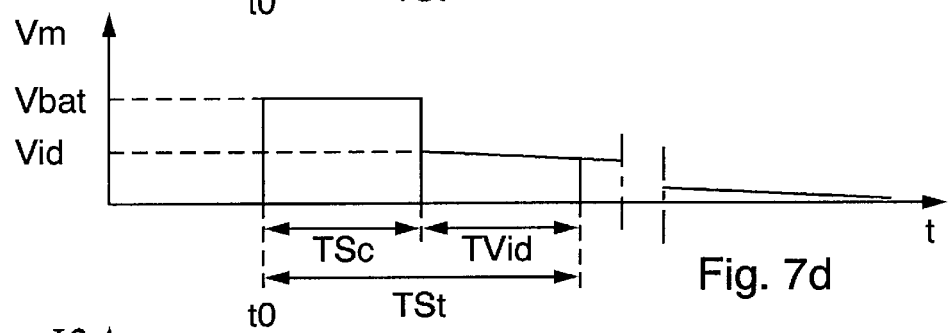
FIG. 7d illustrates in a time diagram the potential at a measurement and control connection between the measurement circuit and the battery circuit according to an embodiment of the present invention.

FIG. 7d illustrates in a time diagram the potential at the dividing connection 16 between the in series connected resistors R1, R2, i.e. the measurement voltage Vm, according to an embodiment of the present invention where the time delay controller 310 consists of the capacitor 24 (see FIG. 5).

Just like in FIG. 7c, during measurement of the battery voltage Vbat, which is initiated at the start time to, both the control switch Sc and the time delay switch St are closed for a time period TSc beginning at the start time t0 (see FIGS. 7a and 7b). Likewise, the identification voltage Vid is measured during the time period TVid while the control switch Sc is open and the time delay switch St is closed (see FIGS. 7a and 7b). However, in contrast with the measurement of the identification voltage Vid described in FIG. 7c, the identification voltage Vid is slightly decreasing during and after measurement of the identification voltage Vid.

Figure 7E:
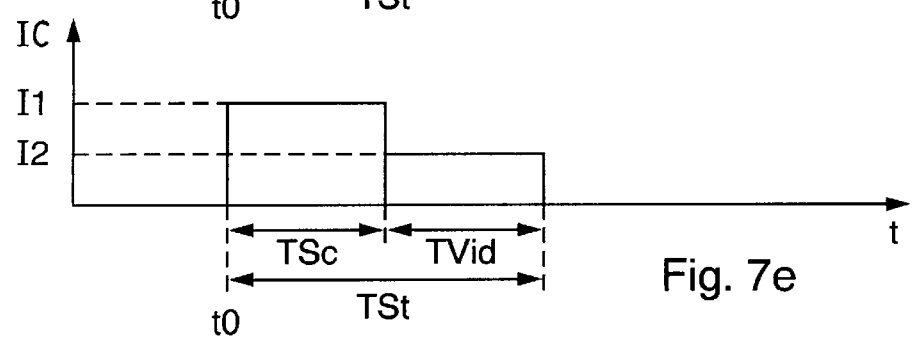
FIG. 7e illustrates in a time diagram the total current consumption of the measurement circuit and the battery circuit.

FIG. 7e illustrates in a time diagram a total current consumption IC of the measurement circuit 1 and the battery circuit 14.

The total current consumption IC of the measurement circuit has a value I1 during measurement of the battery voltage Vbat and a value I2 during measurement of the identification voltage Vid (see FIGS. 7c and 7d).

As mentioned the mobile station 110 requires only three connections to the battery equipment 120 namely the battery voltage connection 9, the measurement and control connection 10 and the ground connection 11. The measurements described in connection with FIG. 7 are performed with only these three connections.

FIG. 8 illustrates in a diagram examples of how the division ratio between the resistance of different in series connected resistors R1, R2 of the battery circuit 14 illustrated in FIG. 2 can vary in different embodiments of the present invention.

In order to distinguish different battery types from each other, the battery identification voltage Vid vary between different intervals for different types of batteries, i.e. the value of the identification voltage Vid is different for different types of batteries. As can be seen in the diagram in FIG. 8, the identification voltage Vid can for instance be
(0.6–0.7)*Vbat for a first battery type 1,
(0.7–0.8)*Vbat for a second battery type 2, and
(0.8–0.9)*Vbat for a third battery type 3.

The interval (0.9–1.0)*Vbat is reserved for closing the time delay switch St, i.e. the inverter 420 has a voltage threshold of 0.9*Vbat (see FIG. 2).

In the diagram in FIG. 8, the battery identification voltage Vid is a division ratio Z*Vbat of the battery voltage Vbat. A resistor R1 of the in series connected resistors R1, R2 which is connected to the battery voltage connection 9 has a predetermined first resistance $X_1$. The second resistor R2 of the in series connected resistors R1, R2 which is connected to ground 12 has a predetermined second resistance $X_2$.

In FIG. 8 the division ratio Z*Vbat is calculated as $(X_2/(X_1+X_2))$*Vbat, i.e. Vid=$(X_2/(X_1+X_2))$*Vbat.

Figure 9:
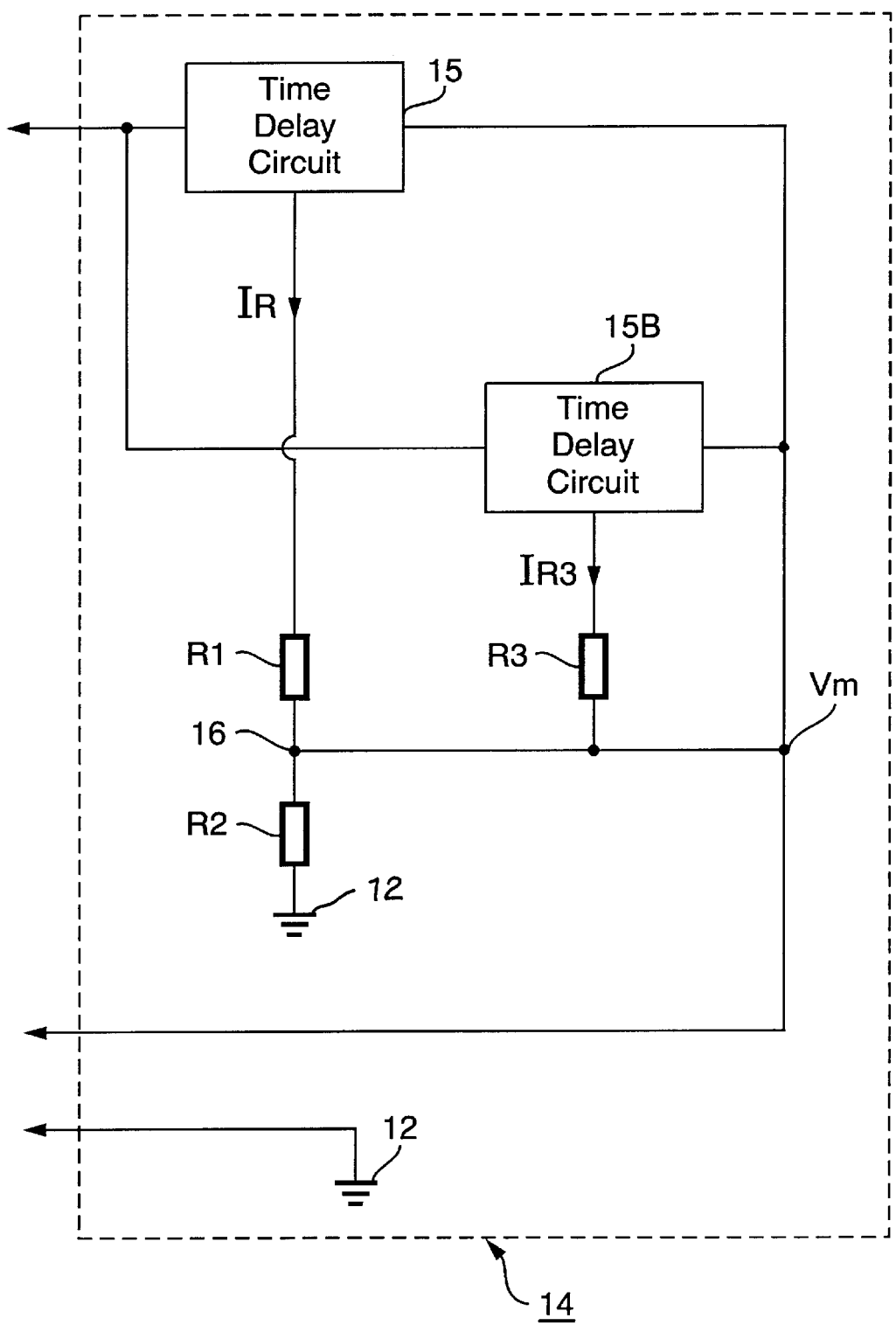
FIG. 9 illustrates in a scheme an embodiment of the battery circuit of the present invention.

FIG. 9 illustrates in a scheme an embodiment of the battery circuit 14 of the present invention.

In FIG. 9 there is a second time delay circuit 15B besides the first time delay circuit 15 (see FIG. 3). The first time delay circuit 15 is connected to the first and second in series connected resistors R1, R2. The second time delay circuit 15B is connected to the battery voltage connection 9, to the measurement and control connection 10 and to two in series connected resistors. The two resistors connected to the second time delay circuit 15B are a third resistor R3 in series connected with the second resistor R2 being connected to ground 12. There is a dividing connection 16 between the first and second in series connected resistors R1, R2 (see FIG. 2). The current IR passes the first in series connected resistor R1 on identifying and a current $I_{R3}$ passes the third in series connected resistor R3 on identifying.

Each of the resistors in FIG. 9 has a predetermined resistance. As described in FIG. 8 the first resistor R1 has the first resistance $X_1$ and the second resistor R2 has the second resistance $X_2$. Accordingly, the third resistor R3 has a third resistance $X_3$.

In FIG. 9, the measurement circuit 1 is initiating measurement of two identification voltages Vid; first a first identification voltage and then a second identification voltage. The values of the measured identification voltages differ from each other, and for instance can the intervals for the different values of the identification voltages be (0.7–0.8)*Vbat and (0.8–0.9)*Vbat.

Also in FIG. 9, as described in FIG. 8, the battery identification voltage Vid is a division ratio Z*Vbat of the battery voltage Vbat. In FIG. 9 the division ratio Z*Vbat is calculated as $(X_2/(X_1+X_2))$*Vbat for the first identification voltage when the first time delay circuit 15 is used for the measurement. The division ratio Z*Vbat is calculated as $(X_2/(X_2+X_3))$*Vbat for the second identification voltage when the second time delay circuit 15B is used for the measurement.

It is to be understood that it is within the scope of the present invention to implement at least a third time delay circuit in the same way as the second time delay circuit 15B is implemented in FIG. 9.

Figure 10:
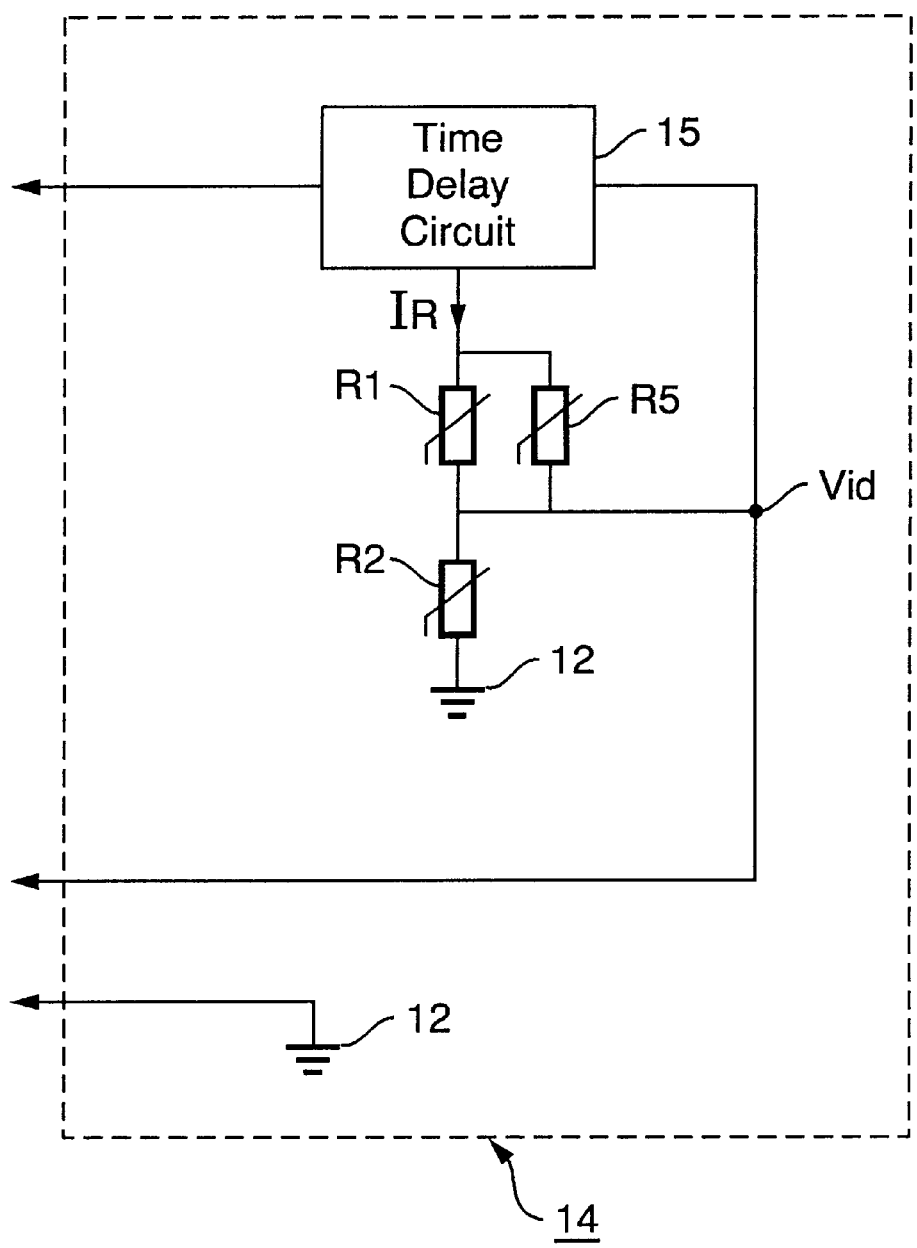
FIG. 10 illustrates in a scheme an embodiment of the battery circuit of the present invention.

FIG. 10 illustrates in a scheme an embodiment of the battery circuit 14 of the present invention.

In FIG. 10 there are three resistors R1, R2, R5 connected between the battery voltage connection 9 (see FIG. 2) and ground 12 on identifying, i.e. during measurement of the identification voltage Vid and the battery voltage Vbat which are the values of the measurement voltage Vm during the time periods TSc and TVid, respectively (see FIGS. 7a–7d). Two of these resistors R1, R5, which are connected to the battery voltage connection 9 on identifying, are connected in parallel with each other. The advantage with this embodiment is that the interval for the value of the identification voltage Vid can be adjusted more easily since resistors can be added in parallel with each other.

In other embodiments of the measurement circuit 1, more than one resistor is connected in parallel with the first resistor R1 connected to the battery voltage connection on identifying.

In the same way as at least another resistor can be connected in parallel with the first resistor R1 connected to the battery voltage connection 9 on identifying, at least another resistor can as well be connected in parallel with the second resistor R2 connected to ground.

In further embodiments of the present invention at least another resistor can be connected in parallel and/or in series with the first resistor R1 connected to the battery voltage connection 9 on identifying, and also at least another resistor can be connected in parallel and/or in series with the second resistor R2 connected to ground 12.

Figures 11A, 11B:
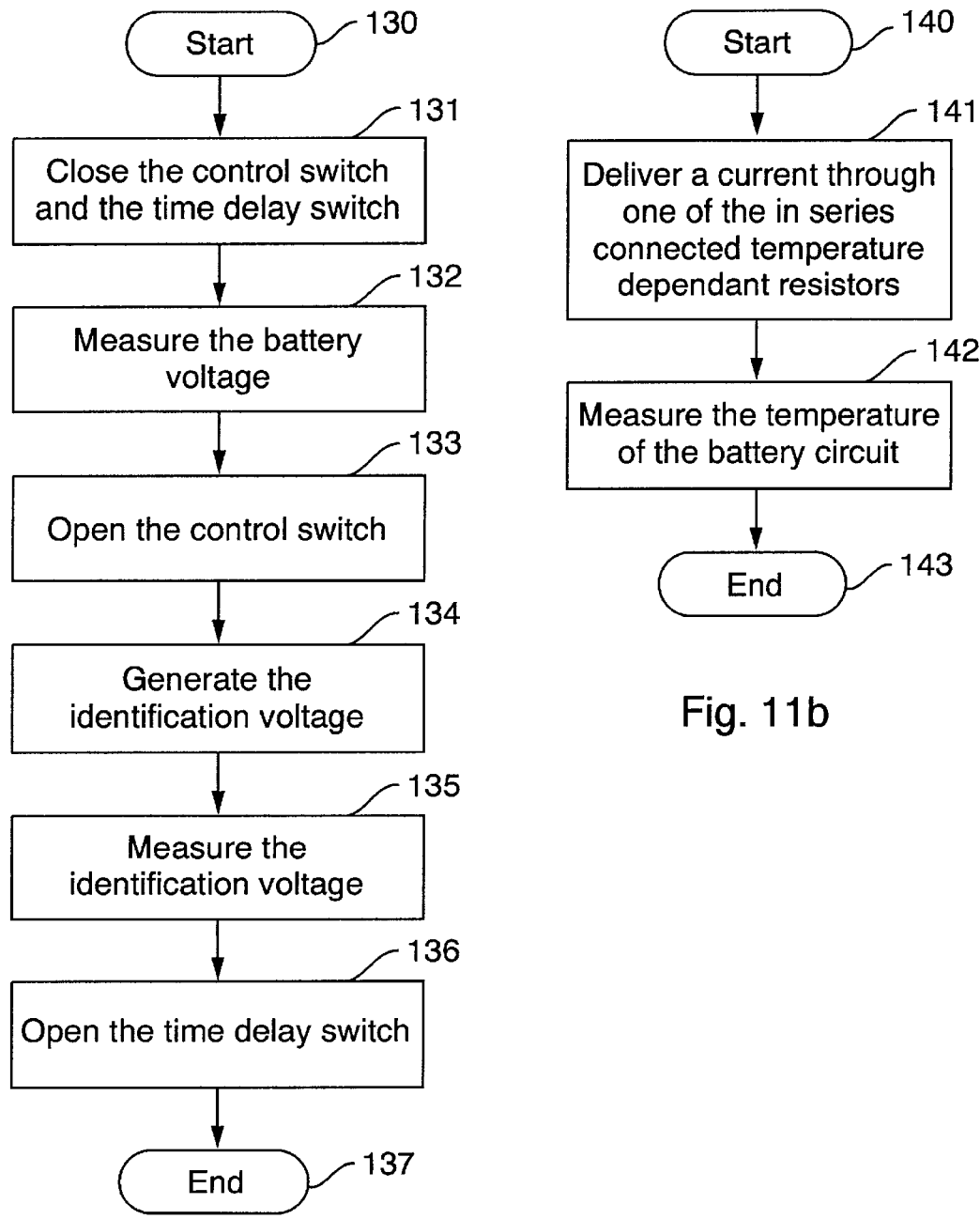
FIG. 11a illustrates in a flowchart a method for identifying a predetermined type of battery.
FIG. 11b illustrates in a flowchart a method for measuring the temperature of the battery circuit of the present invention.

FIG. 11a illustrates in a flowchart a method for identifying a predetermined type of battery according to the present invention. The reference signs referred to in the following text are found in FIG. 2.

The method in FIG. 11a starts at a start position 130. In a next step 131 measurement of the battery voltage Vbat is initiated by means of closing the control switch Sc and the time delay switch St. In a next step 132 the battery voltage Vbat is measured by means of the analogue-to-digital converter ADC comprised in the measurement circuit 1. In a next step 133 measurement of the identification voltage Vid is initiated by means of opening the control switch Sc. Thereafter in a step 134 the identification voltage Vid is generated by means of the in series connected resistors R1, R2. In a next step 135 the identification voltage Vid is measured by means of the analogue-to-digital converter ADC. Thereafter the time delay switch is opened in a step 136. Finally, the method ends in an end position 137.

FIG. 11b illustrates in a flowchart a method for measuring the temperature of the battery circuit according to the present invention. The temperature of the battery circuit is in practice the same as the temperature of the battery. The reference signs referred to in the following text are found in FIG. 2 and FIG. 6.

The method in FIG. 11b starts at a start position 140. In a next step 141 a predetermined current I is delivered from the current generator 25 through the in series connected resistor R2 wherein the in series connected resistors R1, R2 have a common well defined temperature coefficient. In a next step 142 the temperature of the battery circuit 14 is measured by measuring the measurement voltage Vm and calculating the temperature; since the measurement voltage Vm is measured, the current $I_R=I$ is known and the temperature coefficients of the in series connected resistors R1, R2 are known it is possible to calculate the temperature of the battery circuit. The method in FIG. 11b ends at an end position 143.

I claim:

1. A portable radio communication equipment incorporating a battery identification apparatus, said battery identification apparatus comprising:

a battery;

a battery circuit coupled to the battery;

a measurement circuit, coupled to the battery and the battery circuit, including a controller for measuring a battery voltage during a first predetermined time period and for measuring a battery identification voltage during a second predetermined time period, said controller is operable to identify a predetermined type of battery using the measured battery voltage and the measured battery identification voltage;

said battery circuit further including at least one first switch for disconnecting the battery from the battery circuit after identifying the predetermined type of battery; and said measurement circuit further including a second switch for disconnecting the battery from the controller after identifying the predetermined type of battery.

2. The portable radio communication equipment of claim 1, wherein said measurement circuit further includes a current generator for enabling a determination of a temperature of the battery.

3. The portable radio communication equipment of claim 1, wherein said battery circuit further includes at least one time delay controller for controlling the at least one first switch.

4. The portable radio communication equipment of claim 3, wherein each of said at least one time delay controller further includes a selected one of a capacitor and an inverter circuit.

5. The portable radio communication equipment of claim 3, wherein said at least one time delay controller operates to close the at least one first switch and said controller operates to close the second switch when the controller measures the battery voltage.

6. The portable radio communication equipment of claim 3, wherein said at least one time delay controller operates to close the at least one first switch and said controller operates to open the second switch when the controller measures the battery identification voltage.

7. The portable radio communication equipment of claim 3, wherein said at least one time delay controller operates to open the at least one first switch and said controller operates to open said second switch after the controller identifies the predetermined type of battery.

8. The portable radio communication equipment of claim 1, wherein said battery circuit further includes a combination of resistors coupled to the at least one first switch for forming the battery identification voltage when the battery voltage is applied thereto.

9. The portable radio communication equipment of claim 8, wherein said combination of resistors further includes a first resistor and a second resistor connected in series to one another.

10. The portable radio communication equipment of claim 1, further comprising:

a battery voltage connector for connecting the measurement circuit to the battery and the battery circuit;

a measurement and control connector for connecting the measurement circuit to the battery circuit; and a ground connector for connecting the measurement circuit to the battery circuit.

11. A method for determining a predetermined type of battery, said method comprising the steps of:

coupling a battery circuit to a battery by way of at least one first switch;

coupling a measurement circuit to the battery and the battery circuit by way of a second switch;

measuring a battery voltage during a first predetermined time period within a controller of the measurement circuit;

measuring a battery identification voltage during a second predetermined time period within the controller of the measurement circuit;

identifying the predetermined type of battery using the measured battery voltage and the measured battery identification voltage; and disconnecting the battery from the battery circuit and the measurement circuit after identifying the predetermined type of battery.

12. The method of claim 11, further comprising the step of enabling a determination of a temperature of the battery.

13. The method of claim 11, wherein said step of measuring the battery identification voltage further includes applying the battery voltage to a combination of resistors to form the battery identification voltage.

14. The method of claim 11, wherein said step of measuring the battery voltage further includes controlling at least one time delay controller of the battery circuit to close the at least one first switch, and controlling the controller of the measurement circuit to close the second switch.

15. The method of claim 11, wherein said step of measuring the battery identification voltage further includes controlling at least one time delay controller of the battery circuit to close the at least one first switch, and controlling the controller of the measurement circuit to open the second switch.

16. The method of claim 11, wherein said step of disconnecting the battery from the battery circuit and the measurement circuit further includes controlling at least one time delay controller of the battery circuit to open the at least one first switch, and controlling the controller of the measurement circuit to open the second switch.

17. The method of claim 11, wherein said steps of coupling further includes the steps of:

connecting the measurement circuit to the battery and the battery circuit using a battery voltage connector;

connecting the measurement circuit to the battery circuit using a measurement and control connector; and connecting the measurement circuit to the battery circuit using a ground connector.

18. A battery identification apparatus comprising:

a battery;

a battery circuit coupled to the battery;

a measurement circuit, coupled to the battery and the battery circuit, including a controller for measuring a battery voltage during a first predetermined time period and for measuring a battery identification voltage during a second predetermined time period, said controller is operable to identify a predetermined type of battery using the measured battery voltage and the measured battery identification voltage;

said battery circuit further including at least one first switch for disconnecting the battery from the battery circuit after identifying the predetermined type of battery; and said measurement circuit further including a second switch for disconnecting the battery from the controller after identifying the predetermined type of battery.

19. The battery identification of claim 18, wherein said measurement circuit further includes a current generator for enabling a determination of a temperature of the battery.

20. The battery identification apparatus of claim 18, wherein said battery circuit further includes at least one time delay controller for controlling the at least one first switch.

21. The battery identification apparatus of claim 20, wherein each of said at least one time delay controller further includes a selected one of a capacitor and an inverter circuit.

22. The battery identification apparatus of claim 20, wherein said at least one time delay controller operates to close the at least one first switch and said controller operates to open the second switch when the controller measures the battery identification voltage.

23. The battery identification apparatus of claim 20, wherein said at least one time delay controller operates to close the at least one first switch and said controller operates to close the second switch when the controller measures the battery voltage.

24. The battery identification apparatus of claim 20, wherein said at least one time delay controller operates to open the at least one first switch and said controller operates to open said second switch after the controller identifies the predetermined type of battery.

25. The battery identification apparatus of claim 18, wherein said battery circuit further includes a combination of resistors coupled to the at least one first switch for forming the battery identification voltage when the battery voltage is applied thereto.

26. The battery identification apparatus of claim 25, wherein said combination of resistors further includes a first resistor and a second resistor connected in series to one another.

27. The battery identification apparatus of claim 18, further comprising:

a battery voltage connector for connecting the measurement circuit to the battery and the battery circuit;

a measurement and control connector for connecting the measurement circuit to the battery circuit; and a ground connector for connecting the measurement circuit to the battery circuit.

* * * * *